United States Patent [19]
Fredriksson

[11] Patent Number: 5,248,176
[45] Date of Patent: Sep. 28, 1993

[54] SWIVEL COUPLING DEVICE

[76] Inventor: Lars Fredriksson, Hoglidsv. 16, S-182 46 Enebyberg, Sweden

[21] Appl. No.: 762,022
[22] PCT Filed: Mar. 15, 1989
[86] PCT No.: PCT/SE89/00135
 § 371 Date: Sep. 13, 1991
 § 102(e) Date: Sep. 13, 1991
[87] PCT Pub. No.: WO90/10803
 PCT Pub. Date: Sep. 20, 1990
[51] Int. Cl.⁵ .............................................. T16G 15/08
[52] U.S. Cl. ........................................ 294/1.1; 294/89;
 410/101; 403/164; 248/499
[58] Field of Search ............................ 294/1.1, 89, 82.1;
 410/101; 403/119, 164, 78; 248/499, 500;
 24/115 K

[56] References Cited
U.S. PATENT DOCUMENTS

| 1,754,692 | 4/1930 | Miller | 294/1.1 X |
| 2,190,268 | 4/1939 | Magid | |
| 2,758,440 | 8/1955 | Magid | |
| 3,297,293 | 1/1965 | Andrews et al. | |
| 3,371,951 | 3/1968 | Bryant | 294/89 X |
| 3,628,820 | 12/1971 | Blatt | 294/89 X |
| 3,905,633 | 9/1975 | Larson | 294/1.1 |
| 4,431,352 | 2/1984 | Andrews | 294/1.1 X |
| 4,558,979 | 12/1985 | Andrews | 294/1.1 X |
| 4,641,986 | 2/1987 | Tsui et al. | 294/1.1 X |
| 4,699,410 | 10/1987 | Seidel | 294/1.1 |
| 4,705,422 | 11/1987 | Tsui et al. | 294/1.1 X |
| 4,863,205 | 9/1989 | Schron et al. | 294/89 X |

FOREIGN PATENT DOCUMENTS

| 365430 | 4/1990 | European Pat. Off. | 294/1.1 |
| 8428646 | 1/1985 | Fed. Rep. of Germany | |
| 3400351 | 7/1985 | Fed. Rep. of Germany | 294/1.1 |
| 3435961 | 4/1986 | Fed. Rep. of Germany | 294/1.1 |

Primary Examiner—Johnny D. Cherry
Assistant Examiner—Joseph D. Pape
Attorney, Agent, or Firm—Quarles & Brady

[57] ABSTRACT

A swivel coupling device for coupling a load to a base member. The device includes an anchor unit securely connected to the base member, a rotary member, which is rotatably journaled in the anchor unit and is provided with oppositely located recesses having pivot bearing surface portions, and a pivotable coupling member, which is provided with inwardly bent leg end portions. The leg end portions have retaining projections and are pivotably journaled in the pivot bearing surface portions. In addition, the anchor unit is shaped so as to securely hold the end portions of the coupling member within the oppositely located recesses. The coupling member is detachable from the rotary member when the anchor unit is disconnected from the base member.

14 Claims, 6 Drawing Sheets

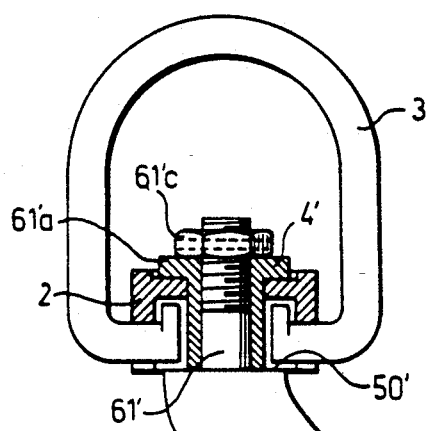
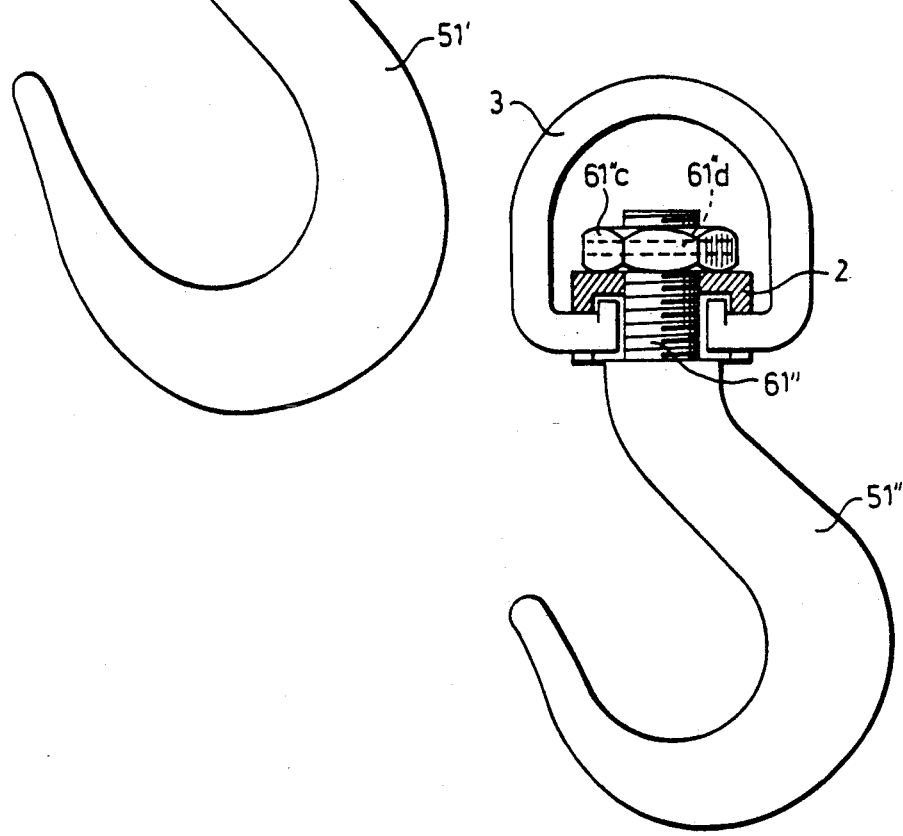

SWIVEL COUPLING DEVICE

The present invention relates to a swivel coupling device for coupling a load, e.g. by way of a chain, a wire or a strap, to a base member, e.g. a heavy object to be lifted or a lifting hook or the like, the coupling device being of the general kind stated in the preamble of claim 1.

Such a coupling device is known from U.S. Pat. No. 3,297,293, wherein the two legs of the pivotable coupling member are constituted by straight end portions, which are parallel to each other and are pivotably connectable to the central rotary member by means of separate pivot pins extending through corresponding holes in each leg end portion and attachable to the rotary member by a lock pin fitted into a vertical bore through upper and lower parts of the rotary member. Such an arrangement involves a large number of separate small parts, which have to be assembled when completing the coupling device to make it operative. Furthermore, the overall strength of the device is dependent on the strength of the relatively small lock pins holding the pivot pins in place.

A similar device is known from the German Utility Model specification G 84 28 646.6, disclosing a closed loop coupling member which is pivotably connected to a rotary member at the side thereof, i.e. laterally offset the rotary axis of the device. This will cause an additional bending moment on the device, whereby the overall strength thereof is impeded.

The object of the present invention is to provide an improved coupling device of the kind referred to initially, wherein the pivotable coupling member is pivotable at a pivot axis extending transversally through the rotary axis of the rotary member, so as to provide maximum strength and optimal operative conditions, while minimizing the number of separate parts in order to facilitate assembly of the device. Another object is to provide a coupling device enabling a large number of embodiments of the pivotable coupling member for various specific requirements of use.

These and other objects, to be discussed below, are obtained by the general features stated in the characterizing portion of claim 1.

Thus, instead of using separate pivot pins, as in abovementioned US reference, the legs of the coupling member are bent inwards towards the other leg, so as to be pivotably journalled and lockingly received in oppositely located recesses in the rotary member. Hereby, the number of separate parts is reduced while at the same time providing a stronger pivot connection. The leg end portions can be separate from each other or integrally joined to each other (cf. claim 2).

Further advantageous features are stated in the claims 3-10.

The invention will now be described further below with reference to the appended drawings illustrating some preferred embodiments of the inventive concept.

FIGS. 15 and 16 illustrate two further modifications of the first embodiment with the base member constituted by a lifting hook.

Figure 1:
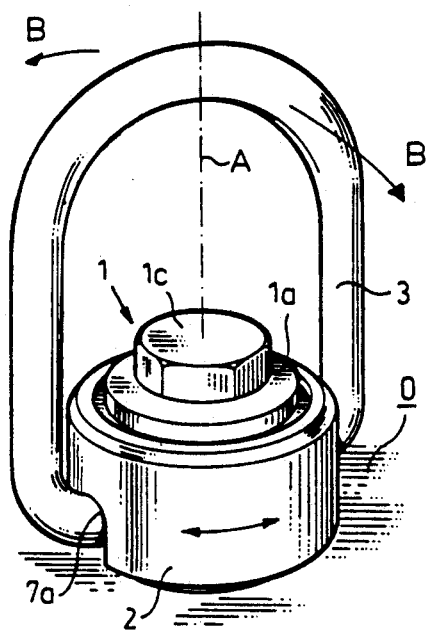
FIG. 1 shows in a perspective view a first embodiment of the coupling device according to the invention.
Figure 2:
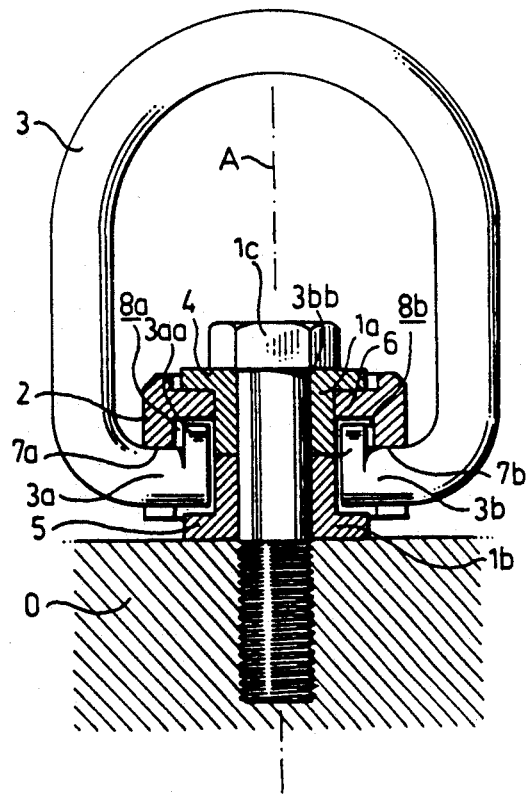
FIG. 2 shows the device of FIG. 1 in a central section.

In the preferred, first embodiment, as illustrated in FIGS. 1 and 2, the swivel coupling device comprises three basic components, viz. an anchor unit 1 with two mutually detachable sleeve portions 1a, 1b securely fastened, by means of a central screw 1c, to a heavy object 0 to be lifted, a rotary member 2 in the form of a cylindrical body, which is rotatable relative to the anchor unit 1, and a pivotable coupling member 3, which is pivotably connected to the rotary member 2 so as to enable a secure coupling of a load, e.g. via a non-illustrated chain, a wire with a hook or a strap, to the object 0 while ensuring that the applied load is always directed straight towards the central rotary axis A of the device.

The sleeve portions of the anchor unit 1 comprise an upper sleeve portion 1a having an upper, radially outwardly projecting flange 4 and a lower sleeve portion 1b having a lower, radially outwardly projecting flange 5. The cylindrical, tubular rotary body 2 is provided with an upper, radially inwardly projecting flange 6, which bears rotatably onto the outside surface of the sleeve portion 1a and holds the rotary body 2 against upward movement passed the upper flange 4. The lower portion of the rotary body 2 is provided with diametrically opposed, arcuate openings or recesses 7a, 7b extending all the way through the lower edge thereof so as to enable insertion of the two leg end portions 3a, 3b of the pivotable coupling member 3 when the sleeve portions 1a, 1b are detached from one another.

Thus, the recesses 7a, 7b of the rotary member 2 merge into an internal recess 8a, 8b below the upper flange 6 for receiving the end portions 3a and 3b of the pivotable coupling member 3, said internal recess 8a, 8b extending either circumferentially all around the rotary member 2 or being restricted to the diametrically opposed regions of the end portions 3a, 3b. In the latter case, the internal recesses 8a, 8b are preferably provided with arcuate bearing surface portions dimensioned to retain, with a slight play, the respective end portion 3a, 3b. These end portions 3a, 3b of the legs of the coupling member 3 are each provided with a guiding projection 3aa, 3bb, e.g. extending radially and transversally from the respective leg end portion 3a, 3b and provided with an arcuate outer surface portion, which may slidingly contact the respective bearing surface portions of the internal recess 8a, 8b in the rotary member 2.

During assembly of the device, the parts 3, 1a, 1c and 2 are put together and are mounted onto the lower sleeve portion 1b, whereupon the screw 1c is screwed into the threaded bore of the object 0 so as to securely couple the parts together. Upon assembly, the rotary member 2 and the leg end portions 3a, 3b inserted into the recess 8a, 8b will hold the rotary and pivotable members against vertical movement while permitting rotary movement of the rotary member 2 relative to the axis A as well as pivotal movement of the coupling member 3 as indicated by the arrows B in FIG. 1.

Figure 2A:
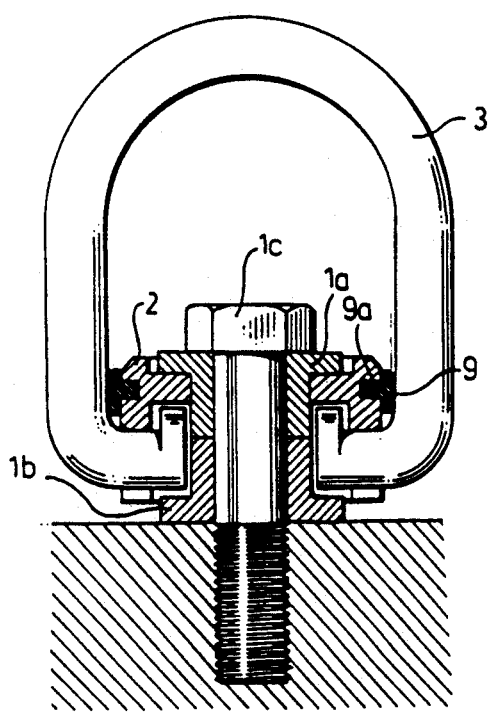
FIG. 2A shows a slightly modified form of the embodiment of FIGS. 1 and 2.

In the modified first embodiment shown in FIG. 2A, there is a mounted a ring 9 of elastic material, e.g. rubber, onto the outside cylindrical exterior surface of the rotary member 2. The ring 9 is secured by a rim portion 9a inserted into a circumferential groove and is dimensioned to resiliently contact the inside of each leg of the coupling member 3, when the latter is held in an upright position (as illustrated), whereby the coupling of a load thereto is facilitated.

Figure 3:
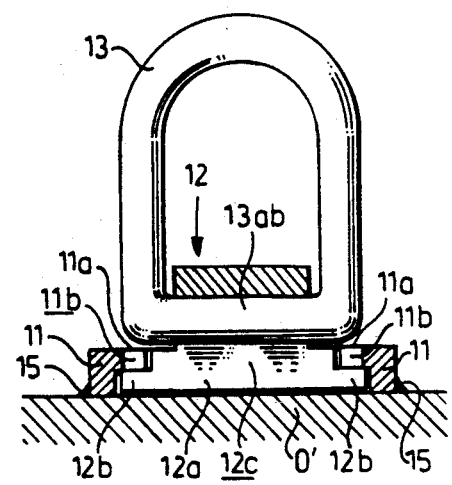
FIGS. 3-5 show in sectional side and top views a second embodiment of the coupling device.
Figure 4:
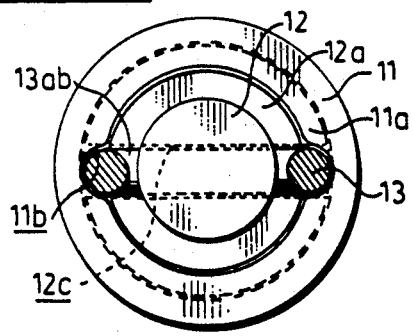
Figure 5:
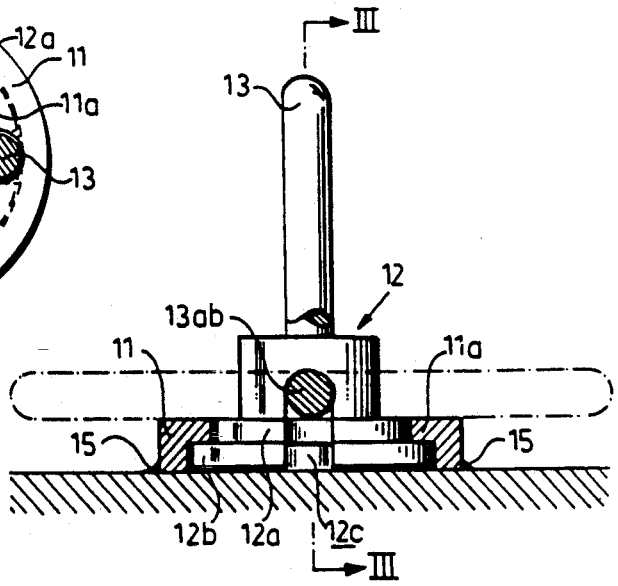

FIGS. 3-5 illustrate a second embodiment of the coupling device, wherein the coupling member 13 is a closed loop member, i.e. the legs thereof are integrally joined to each other and form a straight cross bar portion 13ab. In this embodiment, the rotary member 12 is not centrally journalled. Instead, it is circumferentially journalled in an exterior anchor unit in the form of a ring member 11, which is securely fastened to the object 0' to be lifted. For this purpose, the rotary member 12 is provided with a base portion 12a having a circumferential bottom flange 12b, which extends radially outwardly and is held, with a slight play, between the upper surface of the object 0' and a holding flange 11a projecting radially inwards from the upper portion of the ring member 11.

In order to permit assembly of the various parts, the rotary member 12 has a diametrically extending internal recess 12c, which is dimensioned to receive the cross bar portion 13ab of the coupling member 13 and is extended all the way down through the base portion 12a, so that the cross bar portion 13ab can be inserted from below into the illustrated position before the ring member 11 is put in place. In this embodiment, the holding flange 11a has an inner diameter, which is less than the width of the coupling member 13, and is therefore provided with diametrically opposed recesses 11b. Thus, upon assembly of the two parts 12, 13, the ring member 11 can be put in position from above and thereafter be secured to the object 0', e.g. by welding, as illustrated at 15. In operation, the rotary member 12 can be rotated relative the ring member 11, and the coupling member 13 can be pivoted to any position between the end positions indicated by dash-dotted lines in FIG. 5.

Figure 6:
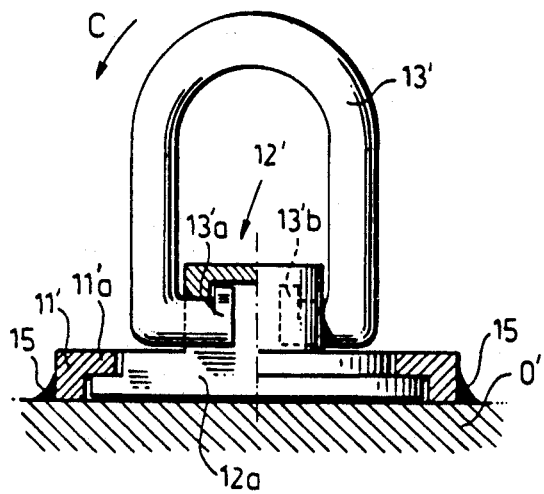
FIG. 6 shows, in a partially sectional side view, a modified form of the second embodiment.

A slight modification of this second embodiment is shown in FIG. 6. Here, the end portions 13'a and 13'b of the coupling member 13' are separate from each other (as in the first embodiment shown in FIGS. 2 and 2A), and the base portion 12a is wide enough to be held by a ring member 11' with an uninterrupted holding flange 11'a. In this case, the coupling member 13' has to be tilted (arrow C) in its own plane when coupling the parts 12' and 13' together during assembly.

Figure 7:
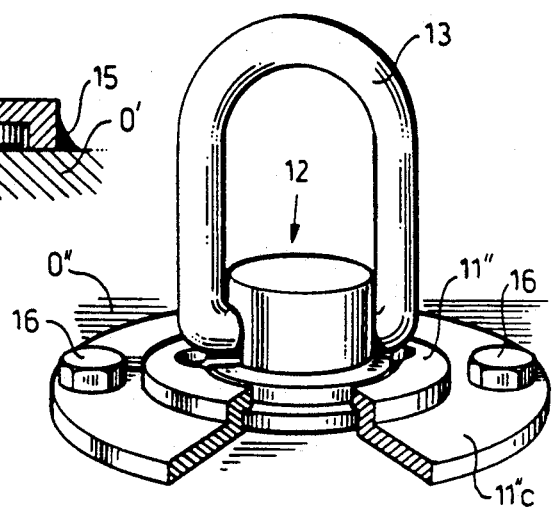
FIG. 7 shows in a perspective view another modification of the second embodiment.

Another modification of the second embodiment, as shown in FIG. 7, differs from the one illustrated in FIGS. 3-5 only in that the ring member 11" is additionally provided with an exterior bottom flange 11"c having two or more circumferentially distributed bores for securing the ring member 11" by screw fasteners 16 onto the object 0" (in which there are corresponding threaded bores).

Figure 8:
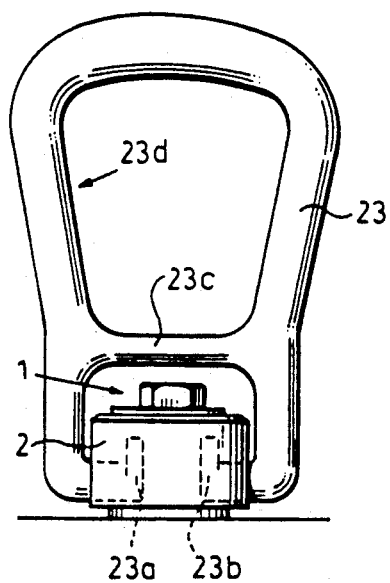
FIGS. 8-10 show in side views alternative forms of the pivotable coupling member included in the first embodiment of the device.
Figure 9:
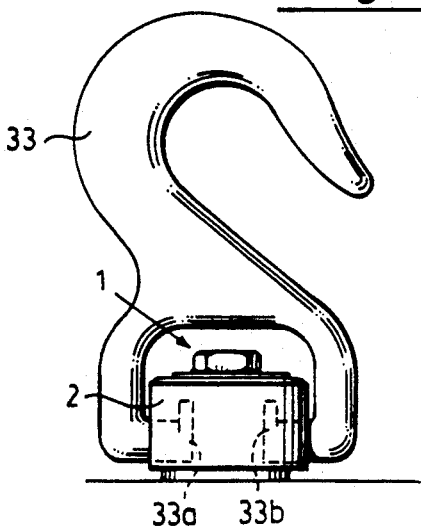
Figure 10:
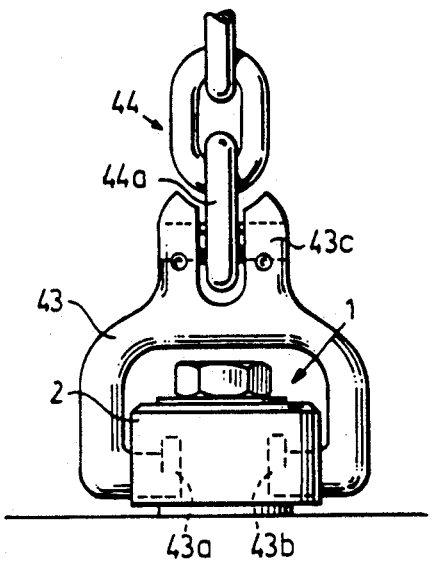

FIGS. 8, 9 and 10 illustrate a few examples of modified coupling members, where the leg end portions 23a, 23b, 33a, 33b; and 43a, 43b, respectively, are formed exactly like the leg end portions 3a, 3b of the coupling member 3 (FIGS. 1 and 2), and where the coupling device as such also corresponds to the first embodiment. In FIG. 8, the coupling member 23 is provided with a web portion 23c so as to form an outer closed loop portion 23d. The coupling member 33 (FIG. 9) has an outer portion formed as a hook, whereas the coupling member 43 (FIG. 10) is provided with an outer connecting portion 43c adapted for detachable connection to an end link 44a of a lifting chain 44.

Figure 11:
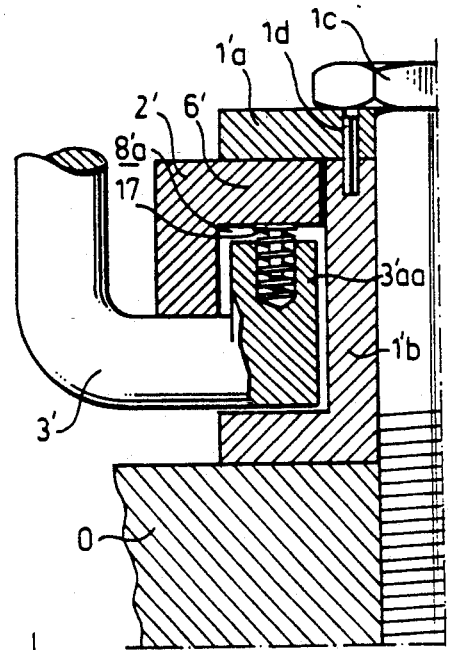
FIGS. 11 and 12 illustrate, in sectional views in a larger scale, two further modifications of the first embodiment.
Figure 12:
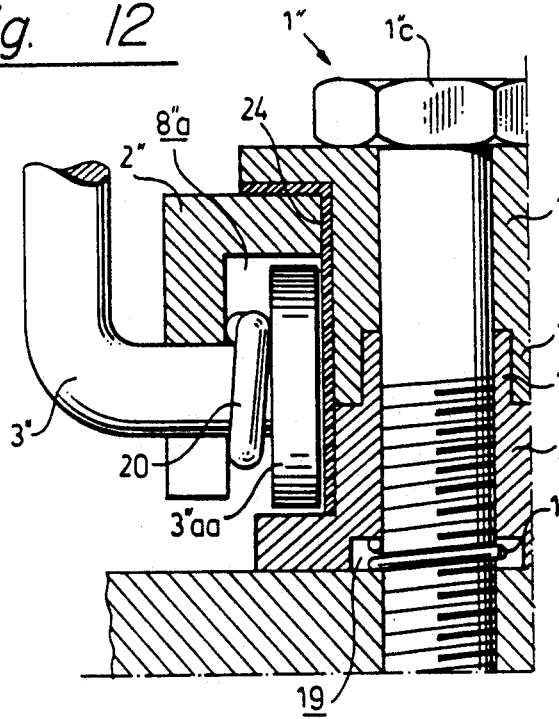

The embodiments shown in FIGS. 11 and 12 likewise essentially correspond to the first embodiment of FIGS. 1 and 2. However, in FIG. 11, the anchor unit 1 consists of a central screw 1c, a lower sleeve portion 1'b of greater axial length (height) and an upper ring plate 1'a, which is non-rotatably connected to the lower sleeve portion 1'b by means of at least one holding pin 1d. The rotary member 2' is slightly modified with an upper flange 6' located at the top of the rotary body 2'. Moreover, and more importantly, there is a spring loaded sliding member 17 mounted on the guiding projection 3'aa of the coupling member 3' and adapted to abut the adjoining bearing surface portion in the internal recess 8'a so as to resiliently hold the coupling member 3' in any desired angular position in relation to the rest of the coupling device.

According to FIG. 12, the upper and lower sleeve portions 1"a, 1"b are provided with mutually fitting joining portions 1"aa and 1"bb, and the fastening screw 1"c is provided with a helical spring 18, which tightly engages the thread of the screw so as to hold the sleeve portions 1"a and 1"b in place during storage and assembly of the device. To house the spring 18, there is a recess 19 in the bottom of the lower sleeve portion 1"b around the central bore. To facilitate relative rotation, a sleeve 24 of a low-friction material, such as a plastic material, e.g. teflon, is inserted between the anchor unit 1" and the rotary member 2".

Furthermore, in the embodiment of FIG. 12, the guiding projection 3"aa of the respective leg end portion of the coupling member 3" is formed as a circular plate, and a pressure helical spring 20 is inserted between the plate 3"a and the inside wall of the rotary body 2", so that the coupling member can be positioned as desired in a similar manner as in FIG. 11.

Figure 13:
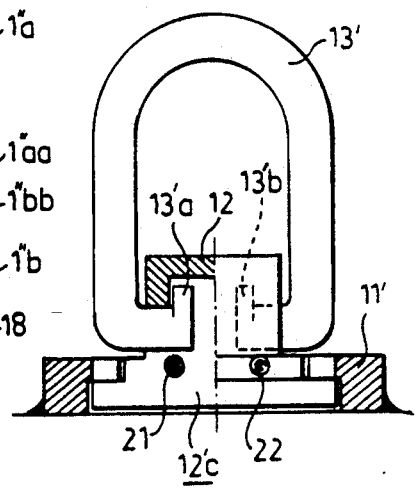
FIG. 13 shows, in a partially sectional side view, a further modification of the second embodiment.

The coupling device shown in FIG. 13 is exactly like the second embodiment of FIG. 3, except for the fact that the leg end portions 13'a, 13'b are separate and that horizontal pins 21,22 are provided to vertically hold the leg end portions of the coupling member and to prevent it from falling down into the internal recess 12'c of the rotary member 12'.

Figure 14:
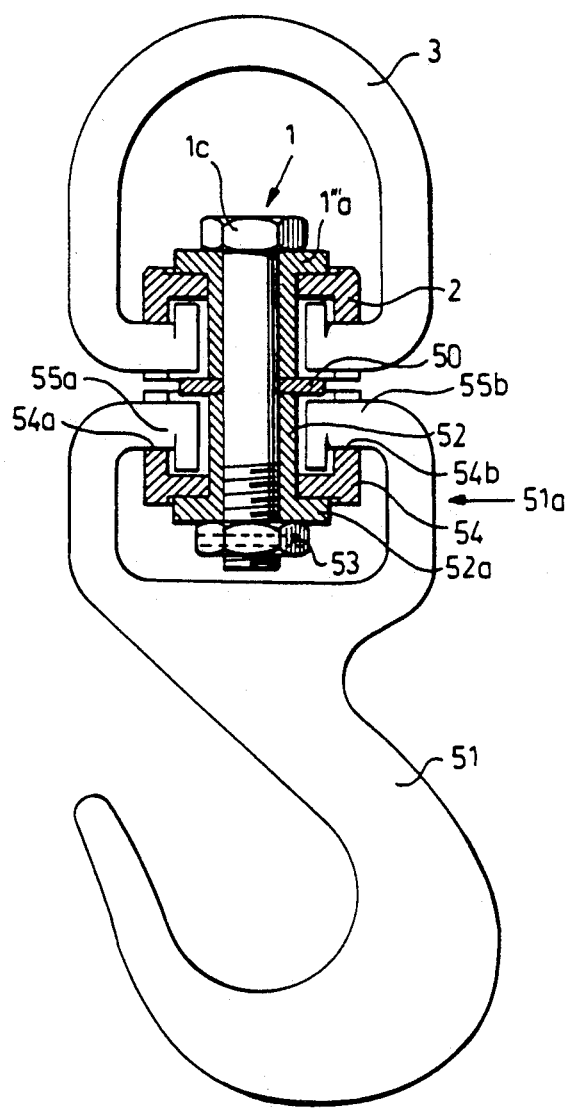
FIG. 14 illustrates, in a sectional side view, a modification of the first embodiment, wherein the base member is constituted by a lifting hook.

In the embodiment illustrated in FIG. 14, the swivel coupling device (upper part of the drawing figure) corresponds essentially to the first embodiment shown in FIGS. 1 and 2, except that the (upper) sleeve portion 1'''a of the anchor unit 1 reaches all the way down to a central plate 50, which together with a swivel journalled hook 51 (lower part of the drawing figure) serves as "base member" (cf the claims) and take the place of the object 0 in FIGS. 1 and 2.

The hook 51 has an upper coupling portion 51a which is journalled for rotary and pivotal movement relative the anchor unit 1 in the same way as the upper coupling member 3. Thus, the anchor unit 1 is common to the coupling member 3 and the hook 51 and includes a sleeve portion 52 with a lower, radially outwardly extending flange 52a, onto the underside of which a nut 53 is tightened on the lower thread of the through-going screw 1c. A rotary, tubular member 54 is rotatably coupled to the sleeve portion 52 and is provided with oppositely located recesses 54a, 54b to pivotably receive the leg end portions 55a, 55b of the coupling portion 51a of the hook 51. It will thus be apparent that the swivel coupling device (1,53,52,54,55a,55b) of the hook portion 51a is quite similar to the first embodiment described above. However, of course, it is also possible to combine the various embodiments to form a corresponding double swivel coupling device.

As shown in FIGS. 15 and 16, it is also possible to use a single swivel coupling device in combination with a lifting hook 51',51" serving as a "base member" and being provided with an upper threaded anchoring pin 61',61". In FIG. 15, the anchor unit comprises the anchoring pin 61', a sleeve member 61'a with an upper, radially outwardly projecting flange 4' and a nut 61'c for securing the sleeve member 61'a to the hook 51'. A rotary member 2 and a pivotable coupling member 3 are arranged in a manner corresponding to FIG. 2, the only difference being that the leg end portions 3a,3b of the coupling member 3 bear against the upper, annular top surface 50' of the hook 51'.

The embodiment shown in FIG. 16 corresponds to the one of FIG. 15 except for the fact that there is no sleeve member in the anchor unit. Instead, the nut 61"c is mounted onto the threaded pin 61" in a position giving a slight axial play for the rotary member 2. The nut 61"c is locked in this position by means of a locking pin 61"d extending through a transverse bore in the threaded pin 61".

Of course, if desired, a ring plate, corresponding to the plate 50 in FIG. 14, can be inserted on top of the annular top surface 50',50" of the hook 51',51".

Those skilled in the art may apply the inventive concept in various ways within the scope of the appended claims.

I claim:

1. A swivel coupling device for coupling a load to a base member, comprising:

an anchor unit connectable to said base member;

a rotary member rotatably journaled in the anchor unit and having pivot bearing surface portions, said rotary member being rotatable around a central rotary axis;

a pivotable coupling member to be connected to said load and comprising two legs, which are integrally connected to each other outside the rotary member, the end portion of each leg being pivotably journaled at said pivot bearing surface portions of the rotary member so as to enable a pivotal movement of said coupling member around a pivot axis extending transversely through said central rotary axis, said end portion of each leg of the coupling member being bent inward towards the other leg so as to extend along said pivot axis towards said rotary axis of the rotary member;

wherein the rotary member comprises oppositely located recesses being partially defined by said pivot bearing surface portions and being open towards said base member along the length of said end portions of the legs of said coupling member so that, when the swivel coupling device is disassembled, the coupling member can be inserted with its leg end portions into said recesses of the rotary member;

wherein the end portions of the legs of the coupling member are integrally joined to each other so as to extend continuously and centrally through an internal recess of the rotary member along a diameter thereof, said internal recess merging into said oppositely located recesses;

wherein said anchor unit is shaped so as to securely hold the end portions of the legs of the coupling member within said recesses upon assembly of the swivel coupling device while permitting rotation of the rotary member and pivoting of the coupling member; and wherein said rotary member comprises a base portion with a circular bottom flange, which extends radially beyond the diameter of the rotary member in the region of said oppositely located recesses, an internal recess being extended downwards through said base portion to permit detachment of the coupling member from the rotary member, and wherein the anchor unit comprises a ring member, which is securable to the base member and is provided with a radially inwardly projecting holding flange dimensioned to hold said bottom flange of the rotary member in place onto the base member while permitting relative rotation.

2. A swivel coupling device for coupling a load to a base member, comprising:

an anchor unit connectable to said base member;

a rotary member rotatably journaled in the anchor unit and having pivot bearing surface portions, said rotary member being rotatable around a central rotary axis;

a pivotable coupling member to be connected to said load and comprising two legs, which are integrally connected to each other outside the rotary member, the end portion of each leg being pivotably journaled at said pivot bearing surface portions of the rotary member so as to enable a pivotal movement of said coupling member around a pivot axis extending transversely through said central rotary axis, said end portion of each leg of the coupling member being bent inward towards the other leg so as to extend along said pivot axis towards said rotary axis of the rotary member;

wherein the rotary member comprises oppositely located recesses being partially defined by said pivot bearing surface portions and being open towards said base member along the length of said end portions of the legs of said coupling member so that, when the swivel coupling device is disassembled, the coupling member can be inserted with its leg end portions into said recesses of the rotary member;

wherein said anchor unit is shaped so as to securely hold the end portions of the legs of the coupling member within said recesses upon assembly of the swivel coupling device while permitting rotation of the rotary member and pivoting of the coupling member; and wherein said coupling member cooperates with resilient means so as to be retained in at least one pivotal position.

3. A swivel coupling device as defined in claim 2, wherein a ring member of elastic material is mounted at the outside of the rotary member so as to engage and resiliently hold the coupling member in an upright position.

4. A swivel coupling device for coupling a load to a base member, comprising:
   an anchor unit connectable to said base member;
   a rotary member rotatably journaled in the anchor unit and having pivot bearing surface portions, said rotary member being rotatable around a central rotary axis;
   a pivotable coupling member to be connected to said load and comprising two legs, which are integrally connected to each other outside the rotary member, the end portion of each leg being pivotably journaled at said pivot bearing surface portions of the rotary member so as to enable a pivotal movement of said coupling member around a pivot axis extending transversely through said central rotary axis, said end portion of each leg of the coupling member being bent inward towards the other leg so as to extend along said pivot axis towards said rotary axis of the rotary member;
   wherein the rotary member comprises oppositely located recesses being partially defined by said pivot bearing surface portions and being open towards said base member along the length of said end portions of the legs of said coupling member so that, when the swivel coupling device is disassembled, the coupling member can be inserted with its leg end portions into said recesses of the rotary member;
   wherein said anchor unit is shaped so as to securely hold the end portions of the legs of the coupling member within said recesses upon assembly of the swivel coupling device while permitting rotation of the rotary member and pivoting of the coupling member; and
   wherein a sleeve of a low friction material is inserted between said anchor unit and said rotary member to facilitate rotation of the rotary member.

5. A swivel coupling device for coupling a load to a base member, comprising:
   an anchor unit connectable to said base member;
   a rotary member rotatably journaled in the anchor unit and having pivot bearing surface portions, said rotary member being rotatable around a central rotary axis;
   a pivotable coupling member to be connected to said load and comprising two legs, which are integrally connected to each other outside the rotary member, the end portion of each leg being pivotably journaled at said pivot bearing surface portions of the rotary member so as to enable a pivotal movement of said coupling member around a pivot axis extending transversely through said central rotary axis, said end portion of each leg of the coupling member being bent inward towards the other leg so as to extend along said pivot axis towards said rotary axis of the rotary member;
   wherein the rotary member comprises oppositely located recesses being partially defined by said pivot bearing surface portions and being open towards said base member along the length of said end portions of the legs of said coupling member so that, when the swivel coupling device is disassembled, the coupling member can be inserted with its leg end portions into said recesses of the rotary member;
   wherein said anchor unit is shaped so as to securely hold the end portions of the legs of the coupling member within said recesses upon assembly of the swivel coupling device while permitting rotation of the rotary member and pivoting of the coupling member; and wherein said base member comprises a lifting hook.

6. A swivel coupling device for coupling a load to a base member, comprising:
   an anchor unit connectable to said base member;
   a rotary member rotatably journaled in the anchor unit and having pivot bearing surface portions, said rotary member being rotatable around a central rotary axis;
   a pivotable coupling member to be connected to said load and comprising two legs, which are integrally connected to each other outside the rotary member, the end portion of each leg being pivotably journaled at said pivot bearing surface portions of the rotary member so as to enable a pivotal movement of said coupling member around a pivot axis extending transversely through said central rotary axis, said end portion of each leg of the coupling member being bent inward towards the other leg so as to extend along said pivot axis towards said rotary axis of the rotary member;
   wherein the rotary member comprises oppositely located recesses being partially defined by said pivot bearing surface portions and being open towards said base member along the length of said end portions of the legs of said coupling member so that, when the swivel coupling device is disassembled, the coupling member can be inserted with its leg end portions into said recesses of the rotary member;
   wherein said anchor unit is shaped so as to securely hold the end portions of the legs of the coupling member within said recesses upon assembly of the swivel coupling device while permitting rotation of the rotary member and pivoting of the coupling member; and
   wherein the end portions of said legs of the coupling members are each provided with a retaining projection, which extends transversely from the respective leg end portion and which is received with clearance in an internal recess portion being located adjacent to said pivot bearing surface portions of the rotary member.

7. A swivel coupling device as defined in claim 6, wherein said end portion of each leg of said pivotable coupling member is substantially cylindrical.

8. A swivel coupling device as defined in claim 7, wherein said pivot bearing surface portions are substantially semicylindrical.

9. A swivel coupling device as defined in claim 7, wherein said retaining projection extends from the cylindrical end portion substantially in a plane being defined by the two legs and the pivot axis of said pivotable coupling member.

10. A swivel coupling device as defined in claim 9, wherein each retaining projection extends in a direction pointing away from the base member.

11. A swivel coupling device as defined in claim 6, wherein said coupling member co-operates with resilient means so as to be retained in at least one pivotal position.

12. A swivel coupling device as defined in claim 7, wherein said resilient means comprises a ring member of elastic material which is mounted at the outside of the rotary member so as to engage and resiliently hold the coupling member in an upright position.

13. A swivel coupling device as defined in claim 6, wherein a sleeve of a low-friction material is inserted between said anchor unit and said rotary member to facilitate rotation of the latter.

14. A swivel coupling device as defined in claim 6, wherein said base member comprises a lifting hook.

* * * * *